(12) United States Patent
Südow et al.

(10) Patent No.: US 8,922,214 B2
(45) Date of Patent: *Dec. 30, 2014

(54) ELECTROMAGNETIC GEOPHYSICAL SURVEY SYSTEMS AND METHODS EMPLOYING ELECTRIC POTENTIAL MAPPING

(75) Inventors: Mattias Südow, Solna (SE); Frederick James Barr, Jr., Pearland, TX (US); Peter Lindqvist, Segeltorp (SE); Robert Juhasz, Stockholm (SE)

(73) Assignee: PGS Geophysical AS, Oslo (NO)

( * ) Notice: Subject to any disclaimer, the term of this patent is extended or adjusted under 35 U.S.C. 154(b) by 254 days.

This patent is subject to a terminal disclaimer.

(21) Appl. No.: 13/471,110

(22) Filed: May 14, 2012

(65) Prior Publication Data
US 2013/0166210 A1 Jun. 27, 2013

Related U.S. Application Data

(63) Continuation-in-part of application No. 13/337,456, filed on Dec. 27, 2011.

(51) Int. Cl.
*G01V 3/08* (2006.01)
*G01V 3/00* (2006.01)
*G01V 3/02* (2006.01)
*G01V 3/12* (2006.01)
*G01V 3/15* (2006.01)

(52) U.S. Cl.
USPC ............ 324/337; 324/334; 324/357; 324/365

(58) Field of Classification Search
USPC ....................................................... 324/337
See application file for complete search history.

(56) References Cited

U.S. PATENT DOCUMENTS 2,293,024 A 8/1942 Klipsch
(Continued)

FOREIGN PATENT DOCUMENTS

| EP | 2230535 A2 | 9/2010 |
| GB | 2479623 A | 10/2011 |
| WO | WO 02/14906 A1 | 2/2002 |
| WO | 2009003604 A3 | 1/2009 |

OTHER PUBLICATIONS

T. Eidesmo, S. Ellingsrud, L. M. MacGregor, S. Constable, M. C. Sinha, S. Johansen, F. N. Kong, H. Westerdahl, Sea Bed Logging (SBL), a new method for remote and direct identification of hydrocarbon filled layers in deepwater areas, First Break, vol. 20, pp. 144-152, Mar. 3, 2002.

(Continued)

*Primary Examiner* — Bot Ledynh

(57) ABSTRACT

The present disclosure describes various geophysical survey systems and methods for mapping an electric potential field. At least one illustrative embodiment includes an electromagnetic (EM) source and geophysical survey cables that each includes multiple electrodes spaced apart along each geophysical survey cable's length, and multiple data acquisition units that each obtains measurements indicative of an electric potential between two the electrodes. A modeling module is included and configured to calculate a reference potential at a selected electrode for each of the plurality of geophysical survey cables, as well as a calculation module to combine signals representative of the measurements to produce signals indicative of the electric potential of each electrode relative to the reference potential.

31 Claims, 12 Drawing Sheets

(56) References Cited

U.S. PATENT DOCUMENTS

| | | | |
|---|---|---|---|
| 2,531,088 | A | 11/1950 | Thompson |
| 2,839,721 | A | 6/1958 | Dewitte |
| 2,872,638 | A | 2/1959 | Jones |
| 3,052,836 | A | 9/1962 | Postma |
| 3,113,265 | A | 12/1963 | Woods et al. |
| 3,182,250 | A | 5/1965 | Mayes |
| 3,329,929 | A | 7/1967 | Burnett |
| 3,514,693 | A | 5/1970 | Cagniard |
| 3,525,037 | A | 8/1970 | Madden et al. |
| 3,967,190 | A | 6/1976 | Zonge |
| 4,041,372 | A | 8/1977 | Miller et al. |
| 4,047,098 | A | 9/1977 | Duroux |
| 4,070,612 | A | 1/1978 | McNeill et al. |
| 4,298,840 | A | 11/1981 | Bischoff et al. |
| 4,617,518 | A | 10/1986 | Srnka |
| 7,023,213 | B2 | 4/2006 | Nichols |
| 7,126,338 | B2 | 10/2006 | MacGregor et al. |
| 7,132,831 | B2 | 11/2006 | Brabers |
| 7,191,063 | B2 | 3/2007 | Tompkins |
| 7,446,535 | B1 | 11/2008 | Tenghamn et al. |
| 7,453,763 | B2 | 11/2008 | Johnstad |
| 7,602,191 | B2 | 10/2009 | Davidsson |
| 7,671,598 | B2 | 3/2010 | Ronaess et al. |
| 7,737,698 | B2 | 6/2010 | Tenghamn et al. |
| 7,834,632 | B2 | 11/2010 | Tenghamn et al. |
| 8,035,393 | B2 | 10/2011 | Tenghamn et al. |
| 8,198,899 | B2 | 6/2012 | Lindqvist |
| 2009/0001987 | A1 | 1/2009 | Davidsson |
| 2010/0017133 | A1 | 1/2010 | Ziolkowski et al. |
| 2010/0045296 | A1 | 2/2010 | Tenghamn |
| 2010/0109671 | A1 | 5/2010 | Hobbs |
| 2011/0255368 | A1 | 2/2011 | Südow et al. |
| 2011/0260730 | A1 | 10/2011 | Südow et al. |
| 2011/0273179 | A1 | 11/2011 | Südow |

OTHER PUBLICATIONS

Constable, Steven, et al., "Mapping Thin Resistors and Hydrocarbons with Marine EM Methods: Insights from 1D Modeling", *Geophysics*, (Mar.-Apr. 2007), pp. G45-G51, vol. 71, No. 2.

Constable, Steven, et al., "An Introduction to Marine Controlled-Source Electromagnetic Methods for Hydrocarbon Exploration", *Geophysics*, (Mar.-Apr. 2007), pp. WA3-WA12, vol. 72, No. 2.

Newman, Gregory A., et al., "Imaging CSEM Data in the Presence of Electrical Anisotropy", *Geophysics,* (Mar.-Apr. 2010), pp. F51-F61 vol. 75, No. 2.

Johan Mattsson, et al., "Error Analysis and Capability Modelling for Towed Streamer Electromagnetics," First Break, Aug. 2012, pp. 91-95, vol. 30.

Johan Mattsson, et al., "Towed Steamer EM: The Challenges of Sensitivity and Anisotropy" First Break, Jun. 2013, pp. 155-159, vol. 31.

Chris Anderson, et al., "An Integrated Approach to Marine Electromagnetic Surverying Using a Towed Streamer and Source" First Break, May 2010, pp. 71-75, vol. 28.

First Australian Patent Examination Report mailed on Dec. 23, 2013, in patent application No. 2012261759, 4 pages.

Burrows, Michael L., "Motion-Induced Noise in Electrode-Pair Extremely Low Frequency (ELF) Receiving Antennas", IEEE Transactions on Communications, (Apr. 1974), pp. 540-542, vol. COM-22, No. 4.

Cirrus Logic, "CS3301A/02A—Low Noise & Low Power. New Seismic Amplifiers Deliver Outstanding Price/Performance Combination", 2007, 1 pg. (Online) (Retrieved on Aug. 26, 2010), Retrieved from the Internet URL http://www.cirrus.com/en/pubs/proBulletin/CS3301A-02A_PB_0807.pdf.

Cirrus Logic, "CRD5376—Multichannel Seismic Reference Design", Nov. 2007, 68 pgs., (Online) (Retrieved on Aug. 26, 2010), Retrieved from the Internet URL http://www.cirrus.com/en/pubs/rdDatasheet/CRD5376_RD2.pdf.

US Non-Final Office Action, dated Jul. 31, 2013, U.S. Appl. No. 13/315,020, "Noise Reduction Systems and Methods for a Geophysical Survey Cable", filed Dec. 28, 2011, 12 pgs.

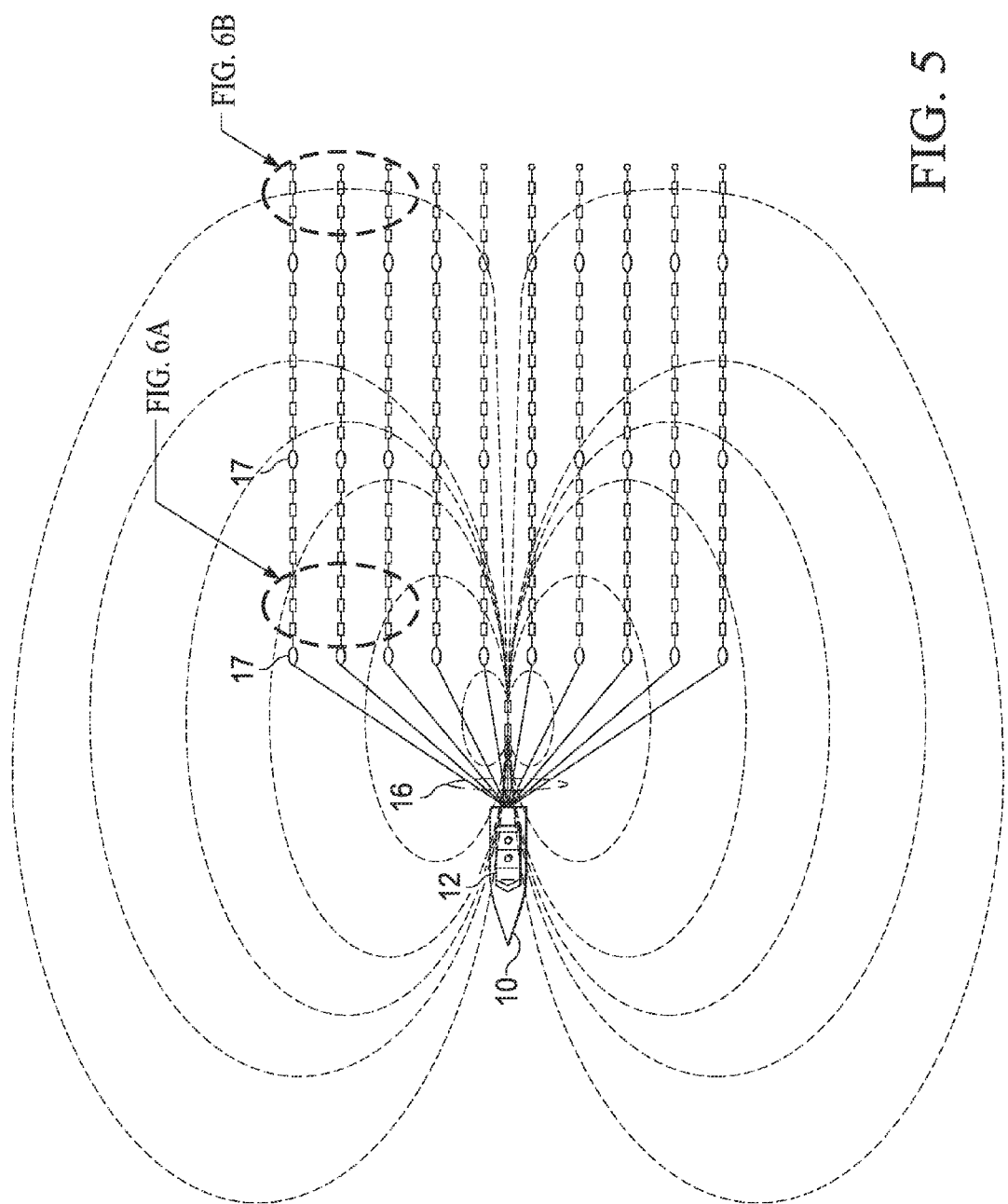

ELECTROMAGNETIC GEOPHYSICAL SURVEY SYSTEMS AND METHODS EMPLOYING ELECTRIC POTENTIAL MAPPING

CROSS-REFERENCE TO RELATED APPLICATIONS

This application is a continuation-in-part of application Ser. No. 13/337,456 titled "Electromagnetic Geophysical Survey Systems and Methods Employing Electric Potential Mapping," and is also related to commonly assigned application Ser. No. 13/337696 titled "In-Line and Broadside Marine Electromagnetic Surveying", which applications are incorporated by reference herein as if reproduced in full below.

BACKGROUND

Geophysical surveys provide data that can provide information about the structure and distribution of rock types and their contents. This information greatly aids searches for water, geothermal reservoirs, and mineral deposits such as hydrocarbons and ores. Most oil companies rely on geophysical surveys to select sites in which to drill exploratory oil wells.

One form of geophysical surveys, electromagnetic (EM) surveys, employ low frequency EM signals that interact with the strata of interest. Such signals may be transmitted from a geophysical source cable towed behind a ship or other surface or subsurface marine vessel travelling across a body of water such as a lake or ocean. The transmitted EM signals propagate through the water and the strata underneath the body of water. As the EM signals interact with the water and strata, the combined resistivity of the water and strata (and, to a lesser extent, the air above the water) causes the EM signals to decay as they propagate away from the source. The resulting electromagnetic field is thus a function of the resistive properties of the water, the sub-bottom strata, and the air. Differences in the strata resistivity along the survey line will translate into minute variations in this electromagnetic field.

Sensors along the length of a geophysical survey cable (which may also be towed by the ship) measure the strength of the electromagnetic field generated by the geophysical source cable, and this acquired data is used to identify and map resistivity contrasts of bodies within the strata (e.g., oil reservoirs). The geophysical survey cable typically obtains electric field measurements with electrodes spaced apart along the length of the cable, and as such, the geophysical survey cable only measures the component of the electrical field parallel to the cable (the "in-line component"). The electrical field component transverse to the survey cable (the "cross-line component") may offer additional information for mapping the resistivity contrasts, yet previous attempts to measure this component in a marine survey environment have proven inadequate. Given the importance of such maps, and the magnitude of the financial decisions that can depend upon them (e.g., whether to drill an exploration well at a particular location), there is significant incentive to improve their quality.

BRIEF DESCRIPTION OF THE DRAWINGS

Accordingly, there are disclosed in the drawings and the following description specific examples of electromagnetic geophysical survey systems and methods employing potential mapping to at least partly address this issue. In the drawings:

FIG. 5 is a top view of the illustrative geophysical survey system of FIG. 1.

Figure 1:
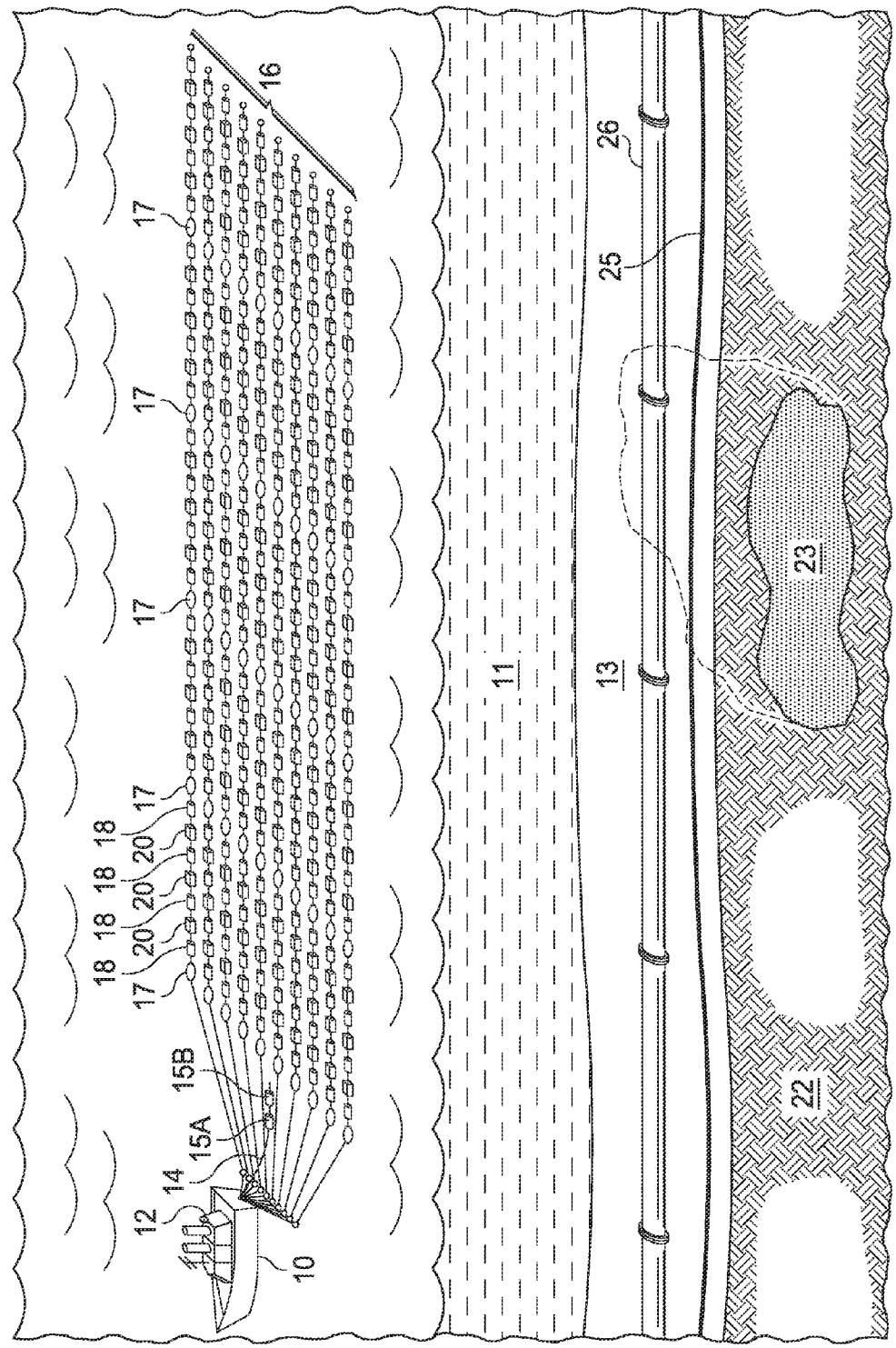
FIG. 1 is an isometric view of an illustrative geophysical survey system.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The paragraphs that follow describe illustrative geophysical survey systems and methods in more detail. First, we present an overview of an illustrative electromagnetic (EM) geophysical survey system to show the basic components of the system and their operation. This overview is followed by a more detailed description of some of the system components. An illustrative EM geophysical survey mapping method is presented, and an illustrative computer-based embodiment of the disclosed systems and methods is provided. Other illustrative embodiments are also presented that utilize alternative techniques for selecting and/or calculating individual potential references usable to determine the electric potential at the electrodes positioned along each of multiple geophysical survey cables.

FIG. 1 shows an overview of an illustrative EM geophysical survey system operating in a marine environment. A marine vessel 10 travels through a body of water 11 and carries a geophysical recording system 12. One or more geophysical source cables 14 and two or more geophysical survey cables 16 are towed through body of water 11. (Though vessel 10 is shown towing both source and survey cables, other surveys may employ multiple vessels with one towing the geophysical survey cables and others towing geophysical sources.) A series of positioning devices 17 can be used to control the arrangement of source and survey cables.

Figure 2:
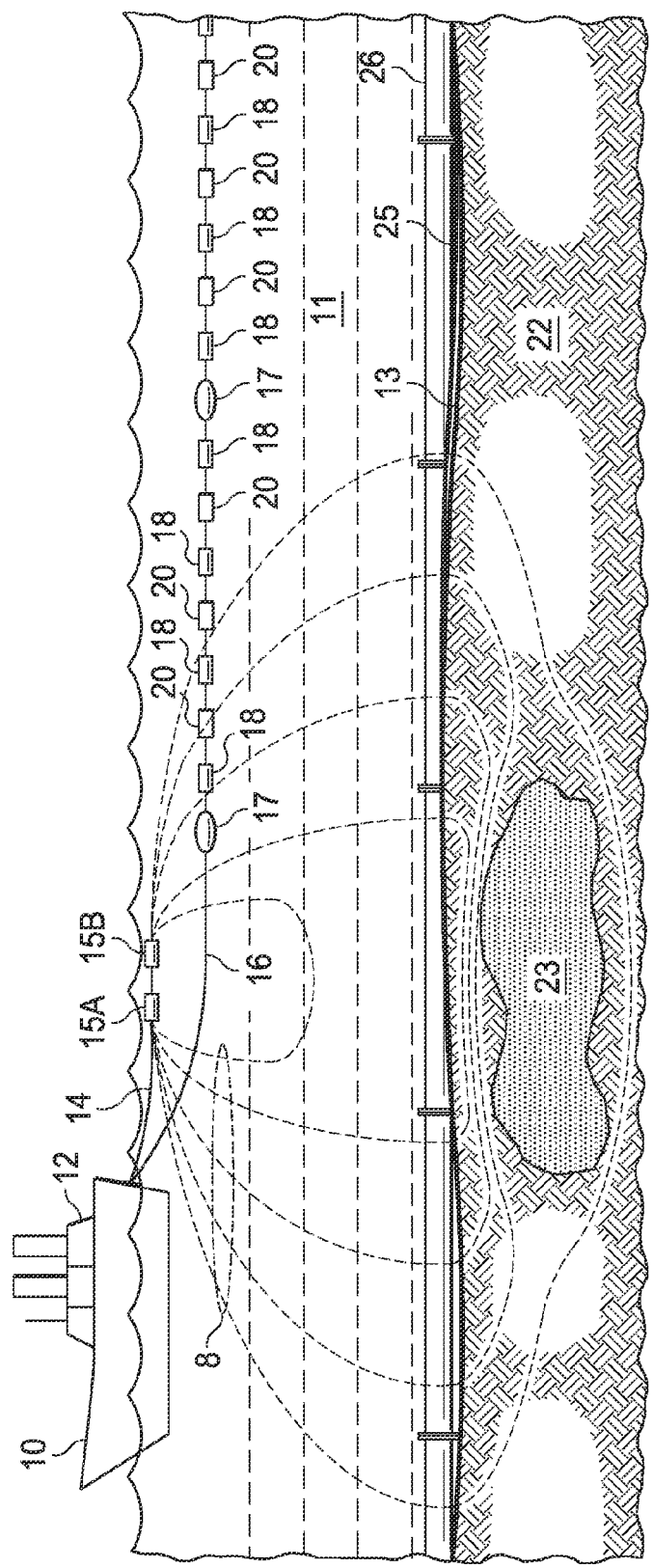
FIG. 2 is a side view of the illustrative geophysical survey system of FIG. 1.

Geophysical source cable 14 includes transmitting electrodes 15A and 15B, which cooperate to produce an electromagnetic (EM) signal 8 (e.g., a pulsed square wave at a frequency between 15 Millihertz and 5 Hertz) that propagates outward, permeating the surrounding water 11 and strata 22 and body 23 as illustrated in FIG. 2. As the EM signal 8 propagates, the varying resistivities of water 11, strata 22, body 23, and the air above the water each influence the strength of the fields created by EM signal 8. The lower the resistivity, the higher the rate at which the electric field amplitude decreases with distance. The lines shown in FIG. 2 represent regions where the electric field is of the same magnitude, with each line representing a different magnitude. As can be seen, variations in the field result from the differing resistivities. The electric field strength of EM signal 8 in the vicinity of a given point along geophysical survey cables 16 thus reflects the cumulative effect of the resistivity of water 11, strata 22 and body 23 (and to a lesser degree, the air above the water). Note that the geophysical survey cables 16 are illustrated for convenience in FIG. 2 as being parallel to the surface of water 11. In some embodiments, one or more geophysical survey cable 16 may not be parallel to the surface of water 11.

Figure 3:
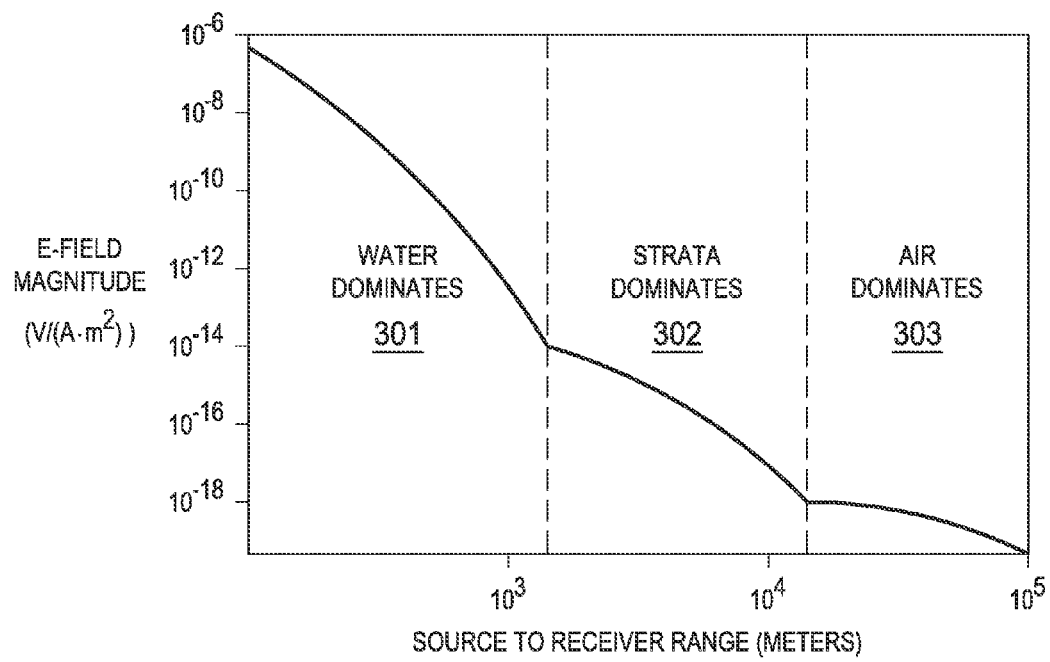
FIG. 3 shows the relative contributions of the strata, water and air resistivity to the decay of the electric field in one embodiment.

FIG. 3 shows a normalized electric field strength as a function of distance from the source in a typical survey environment. The log-log graph has been divided into three regions. Near the source (region 301 of the graph), the low resistivity of water 11 is the dominant factor in determining the magnitude of the electric field. In the intermediate region between about 1.2 km and 11 km (region 302), the dominant factor becomes the relatively higher resistivity of the strata. At longer distances (region 303), it is the air above the water that has the greatest effect on the electric field magnitude. Variations in the electric field strength different from those expected to be caused primarily by strata 22 are attributable to body 23, which enables body 23 to be detected, characterized and mapped.

Figure 4:
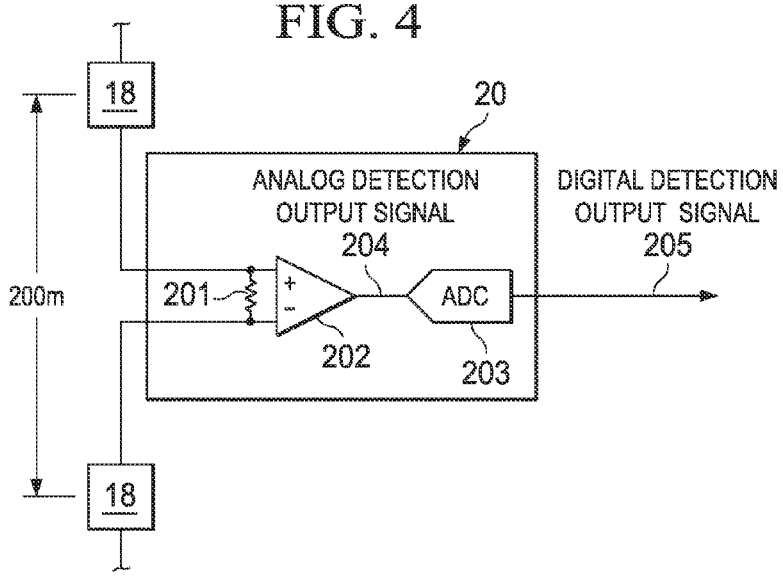
FIG. 4 shows an illustrative data acquisition module.

The geophysical survey cables 16 have pairs of electrodes 18 spaced along their length to detect and measure the electric potential created by EM signal 8. As illustrated in FIG. 4, each pair of electrodes may be spaced about 200 meters apart. Each electrode 18 is electrically exposed to the water through which it is towed. Each electrode pair may be coupled to the inputs of a differential amplifier 202, which may in at least some embodiments incorporate a shunt resistor 201 across the input nodes. The differential amplifier 202 enables data acquisition module 20 to convert the electric potential into a detection signal suitable for transmission to the geophysical recording system 12. While some survey system embodiments record the analog signal from differential amplifier 202, other embodiments include analog-to-digital (A/D) converters 203 that convert the analog signal to a digital signal for storage. The conversion can be done by data acquisition module 20 before the measurements are transmitted to the recording system 12, or in some cases, by the recording system 12 after the analog signal has been received. In the illustrative embodiment of FIG. 4, a digital detection signal 205 is transmitted back to geophysical recording system 12 for storage.

In the illustrated embodiment, the detection signals from the various data acquisition modules 20 are transmitted to recording system 12 via a communications backbone within each geophysical survey cable 16. Recording system 12 stores the data (analog and/or digital) for later processing, though some embodiments may provide real-time processing of the data. Such real-time processing enables the crew to adjust survey parameters as needed to ensure the quality of the acquired survey data.

Each geophysical survey cable 16 has multiple data acquisition modules (e.g., 5 modules per km of cable), and there are multiple geophysical survey cables 16 within the illustrative geophysical survey systems shown and described. The use of multiple geophysical survey cables 16 allows for the acquisition of more data over a larger area in a single pass by marine vessel 10. Such data, acquired concurrently over an area rather than a single straight line, may be used to generate 2D electric potential maps over an area and 3D electric potential maps over a volume, which in turn can be used to map out strata 22. In the illustrative embodiments disclosed, the measurements from electrodes on different geophysical survey cables 16 are correlated to each other by referencing each measurement to a common reference potential.

As explained further below, a common reference potential may be derived from measurements taken at or near the end of geophysical survey cables 16 due in part to the significant length of the survey cables. In at least some embodiments, each survey cable is approximately 8 km in length and is deployed so that the ends of the geophysical survey cables 16 are aligned as shown in FIG. 5. At such a significant distance from transmitting electrodes 15A and 15B, the electric field magnitude is small, making the electric potential relatively constant along a line that is transverse to the lengths of geophysical survey cables 16, particularly when compared with points nearer the source, where a similar transverse line would have stronger fields and more variation in the electric potential. This difference in electric potential geometries is illustrated in FIGS. 6A and 6B, which respectively show the contour lines for the electric field created by EM signal 8 at two different points near three of the geophysical survey cables 16.

Figure 6A:
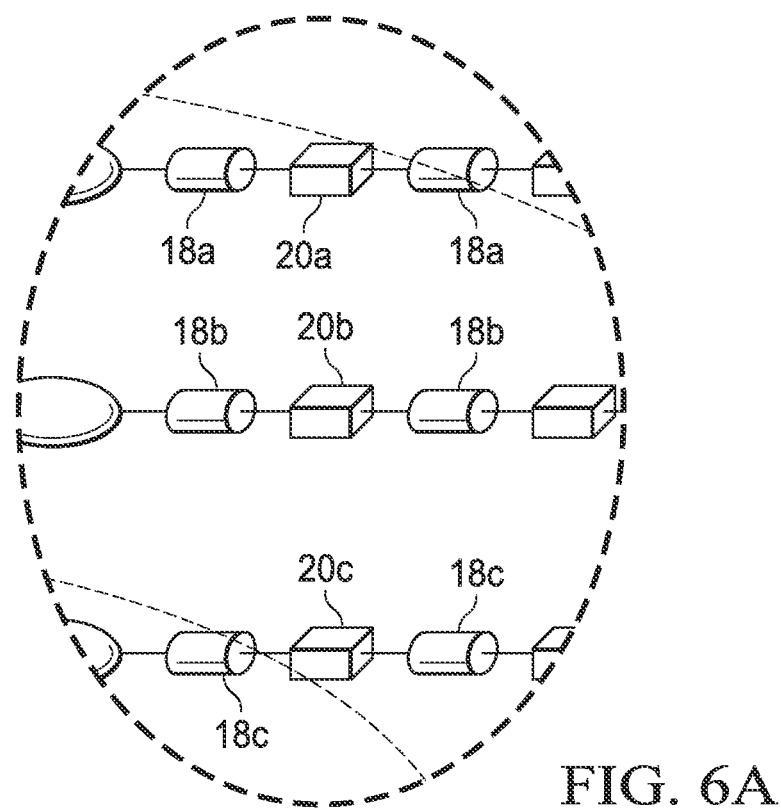
FIGS. 6A and 6B show the contours of the electric potential in different regions.

FIG. 6A illustrates the electric field at a point that is relatively close to transmitting electrodes 15A and 15B. Because of this proximity to the source of EM signal 8, the curvature of the electric field lines is relatively pronounced, and the electric potential measured at each set of electrodes varies significantly between individual cables. FIG. 6A illustrates an arrangement in which the magnitude of the electric potential at electrodes 18c will be greater than that at electrodes 18b, which in turn is greater than that at electrodes 18a.

Figure 6B:
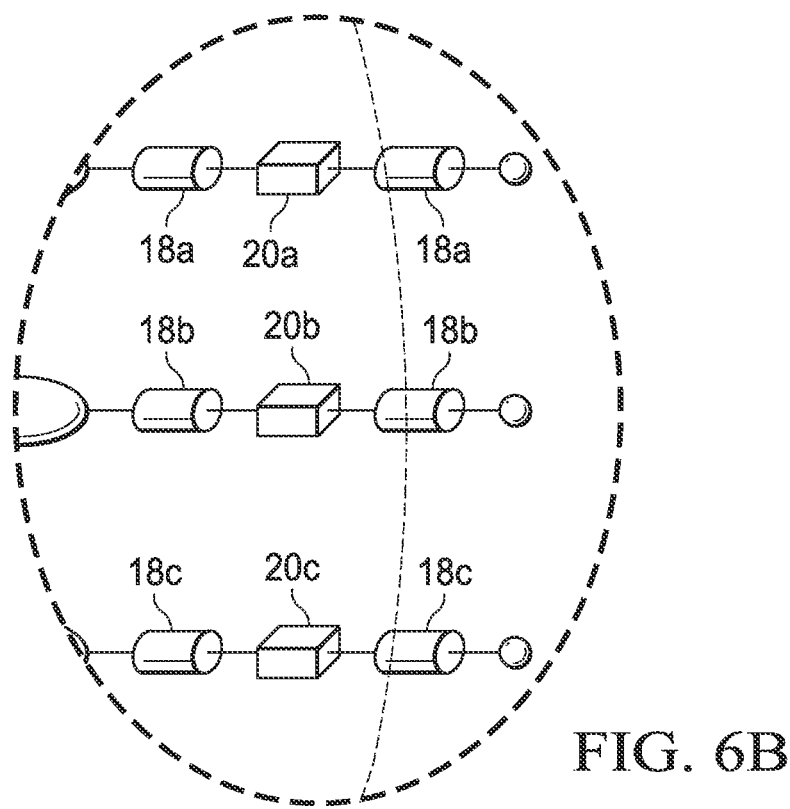

In FIG. 6B, by contrast, the curvature of the electric field contour lines at the ends of the cables (and hence further away from transmitting electrodes 15A and 15B), is almost flat and relatively uniform along a line transverse to the length of geophysical survey cables 16. Thus, the electric potential present at each of electrodes 18a, 18b and 18c is of a comparable magnitude. In at least some illustrative embodiments, this electric potential is assumed to be of the same magnitude at each electrode, while in other illustrative embodiments it is assumed to be of a different magnitude at each electrode within a tolerance range (e.g., within 1% of an assumed magnitude). As a result, measurements at these electrodes at the end of each geophysical survey cable 16 can be employed as a common reference potential against which the remaining measurements along the length of said geophysical survey cables 16 can be measured. While the example shown in FIGS. 6A and 6B only shows three of the geophysical survey cables, this approach may be applied to any number or all of the geophysical survey cables 16 of an illustrative embodiment of the disclosed geophysical survey system. Further, electrodes other than those at the end of each geophysical survey cable may be used, as long as the electric potential at each electrode is at, or with a tolerance range of, a common reference potential.

Figure 7:
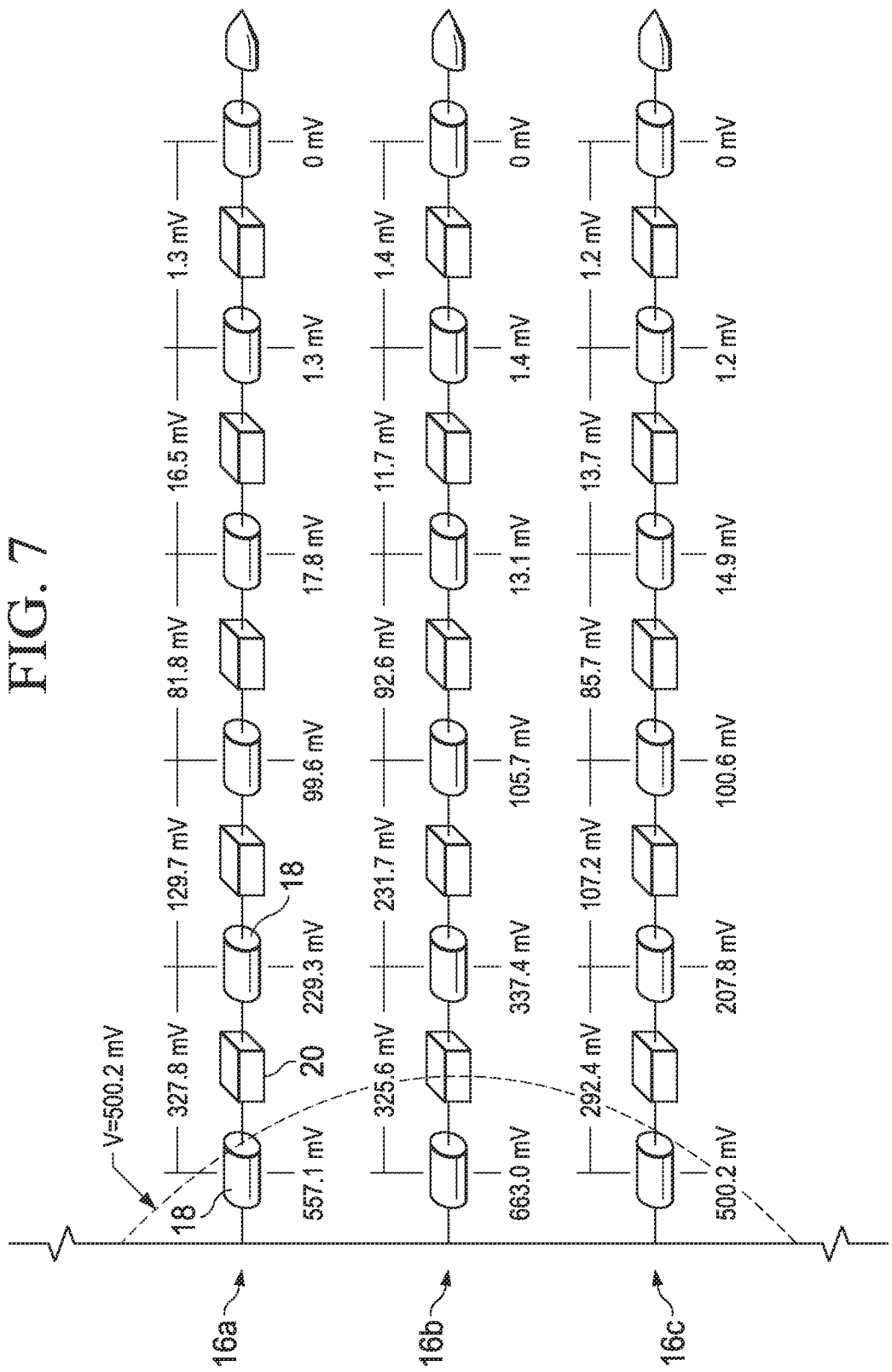
FIG. 7 shows an illustrative use of a common reference to obtain electric potential measurements.

To better understand how a common reference potential is used to correlate electric potential measurements taken by electrodes on different EM geophysical survey cables, an example is provided in FIG. 7, which shows a simplified system of three EM geophysical survey cables 16. Each electrode 18 from one electrode pair is shared with another electrode pair (except for electrodes at either end of each cable). This configuration enables differential measurements from each pair to be summed to determine the overall electric potential difference measured at any point on a given geophysical survey cable 16, relative to the end of each cable.

In the example shown in FIG. 7, the electric potential difference measurements along geophysical survey cable 16a are (in mV) 327.8, 129.7, 81.8, 16.5, and 1.3. When converted into potential measurements relative to the end electrode (which is assumed to be at zero), the potentials at the electrodes along geophysical survey cable 16a are (in mV) 557.1, 229.3, 99.6, 17.8, 1.3, and 0, respectively. Similarly, the illustrated electric potential difference measurements along geophysical survey cable 16b (325.6, 231.7, 92.6, 11.7, and 1.4 mV) translate into electrode potentials (in mV) 663.0, 337.4, 105.7, 13.1, 1.4, and 0, respectively. For geophysical survey cable 16c, the potential difference measurements 292.4, 107.2, 85.7, 13.7, and 1.2, translate into absolute potentials 500.2, 207.8, 100.6, 14.9, 1.2, and 0. Because the adjusted measurements are now all measured relative to a common reference potential, they can be compared and combined (e.g., subtracted from each other) to determine the cross-line component of the electric field between electrodes on two different survey cables. Of course, more sophisticated interpolation can be performed to model the electric potential based on the measured electrode potentials, e.g., a spatial filter can be used. By referencing all the differential measurements along each cable to a common reference potential, the instantaneous measurements of each of the cables can be used to derive and map out an instantaneous two-dimensional slice of the electric potential in a plane defined by the sensor cables. Additional cables may be positioned above or below the horizontal plane to enable a three-dimensional volumetric measurement of the instantaneous electric potential. As geophysical survey cables 16 are towed through the water, additional samples or "snapshots" provide additional measurements that provide redundancy (due to overlapping measurement regions) and new information (due to movement relative to the sub-surface structures). It should also be noted that in at least some illustrative embodiments, multiple snapshots are generated wherein each snapshot represents samples taken at one of multiple signal frequencies generated by the transmitting electrodes (e.g., transmitting electrodes 15A and 15B of FIG. 1). Electric potential field maps may subsequently be generated for each signal frequency.

The measurements taken via the electrodes at or near the end of geophysical survey cables 16 of the disclosed embodiments may be combined in any number of ways to produce a common reference potential. For example, least squares data fitting may be used to determine a common reference potential. In addition, or alternatively, standard deviation computations may be used to identify and exclude statistical outlier measurements. Boundary conditions, such as the Dirichlet boundary condition, together with an a priori knowledge of the electrical potential pattern, may also aid in deriving a common reference potential. Many such statistical techniques, mathematical operations and known conditions that may be applicable to the derivation of a common reference potential will be apparent to those of ordinary skill in the art, and all such techniques, operations and known conditions are within the scope of the present disclosure.

Figure 8A:
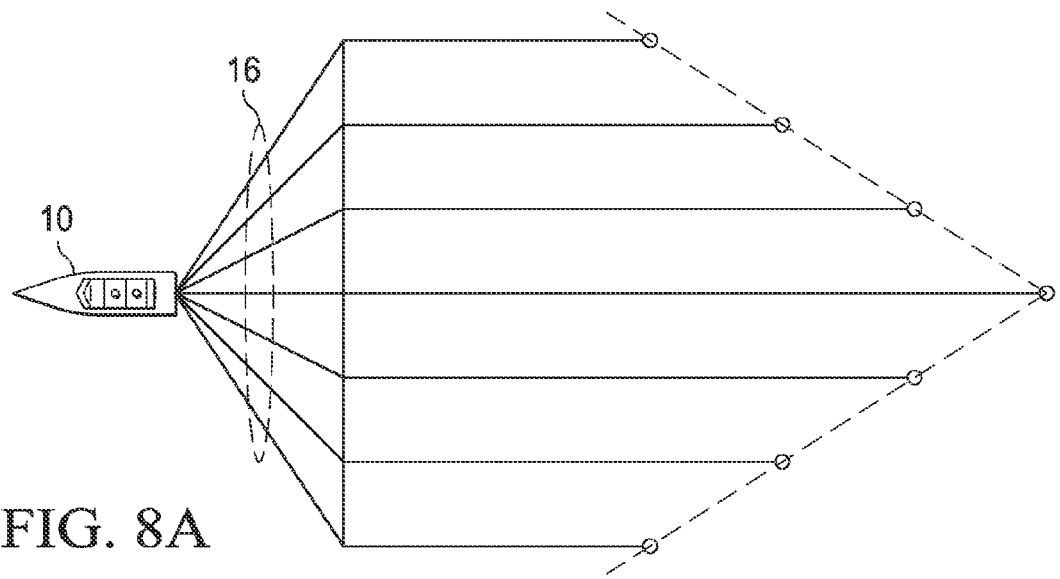
FIGS. 8A and 8B show illustrative survey cable electrode patterns.
Figure 8B:
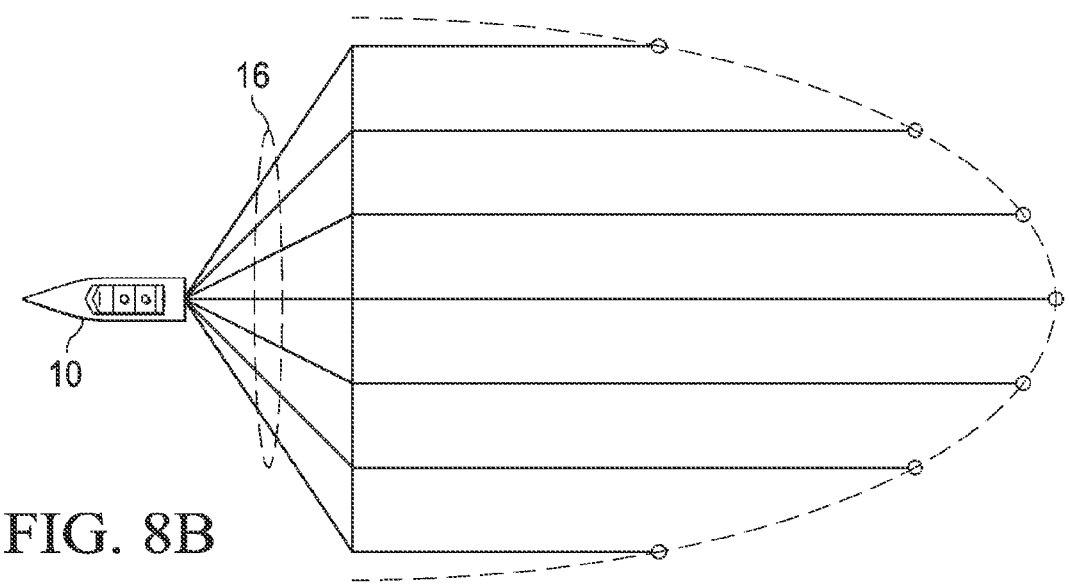

It should be noted that although the embodiment shown in FIG. 5 and described above have the ends of geophysical survey cables 16 aligned along a straight transverse line, other configurations of the survey cables are also within the scope of the present disclosure. For shorter survey cables spaced further apart, the effect of the curvature of the electric field lines of EM signal 8 may be enough to introduce significant and possibly unacceptable variations between the individual measurements at the electrodes at the end of each geophysical survey cable 16. In such situations, the positioning of each individual geophysical survey cables 16 may be selected such that the ends of each survey cable follow the expected curvature of the electric potential at the ends of the cables. For example, the ends of geophysical survey cables 16 may follow a line that is V-shaped or may trace a parabolic path, as shown respectively in the examples of FIGS. 8A and 8B. Many other survey cable geometries and configurations are possible, and all are within the scope of the present disclosure.

Figure 9:
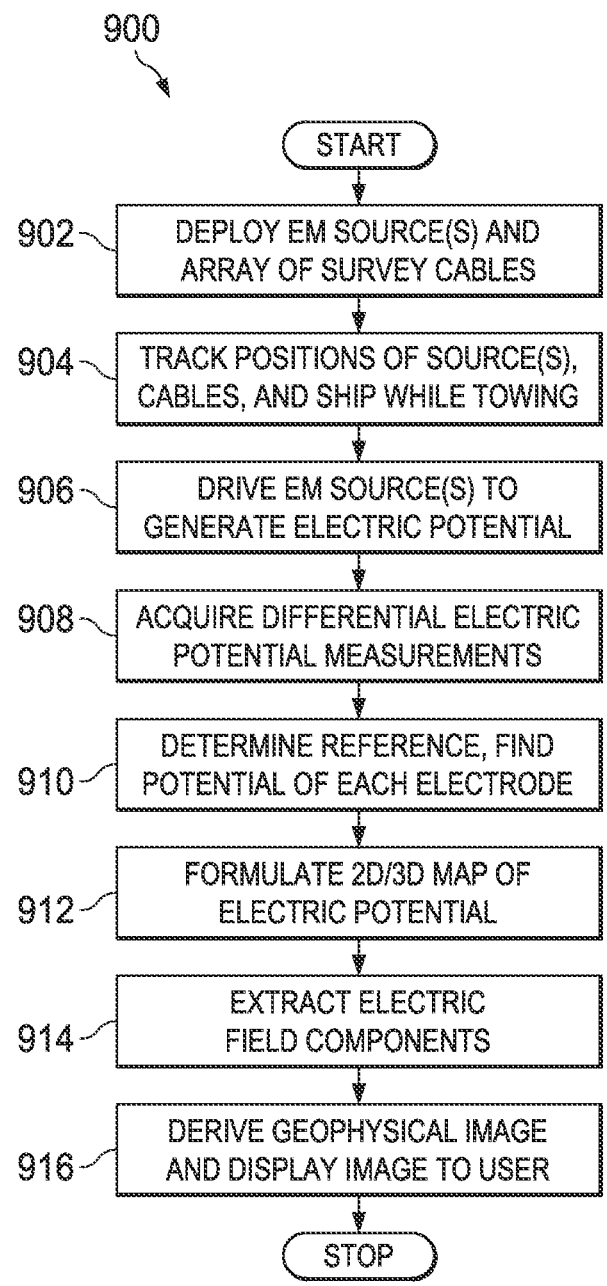
FIG. 9 shows an illustrative method for combining electric potential measurements.

In addition to the embodiments already described to illustrate just some of the possible system and apparatus implementations, illustrative methods are also disclosed herein that perform at least some of the functions disclosed above. FIG. 9 shows one such illustrative method 900, which begins with the deployment of the EM source and survey cables (block 902). The geographic position of the source is tracked as the cables are towed through the water by the ship (block 904), and the EM source is powered on to generate the electric potential (block 906). Differential electric potential measurements are acquired from the electrode pairs along the survey cables (block 908), which are correlated to the tracked geographic position of the source. In at least some illustrative embodiments, such position tracking and correlation is performed using a global positioning system (GPS), whereby the position of the ship is tracked and the positions of the electrodes on the geophysical survey cable are determined relative to the position of the ship. In other illustrative embodiments, the positions of elements along the length of the geophysical survey cable are tracked directly (e.g., using GPS receivers positioned along the length of the geophysical survey cable), rather than relative to the ship's position. Those of ordinary skill in the art will recognize that a wide variety of systems and methods may be used to determine the positions of the electrodes along the length of a geophysical survey cable, and all such systems and methods are within the scope of the present disclosure.

After determining a common reference potential (or in other illustrative embodiments an individual reference potential for each geophysical survey cable), the potential for each electrode on each cable is determined relative to the reference potential (block 910) for each set of acquired samples at a given geographic position, enabling a 2D and/or 3D map of the electric potential to be formulated (block 912). Corresponding electric field components are extracted from the electric potential map (block 914), from which a geophysical image (e.g., a geophysical survey map) is derived and displayed to the user (block 916), ending method 900.

Figure 10:
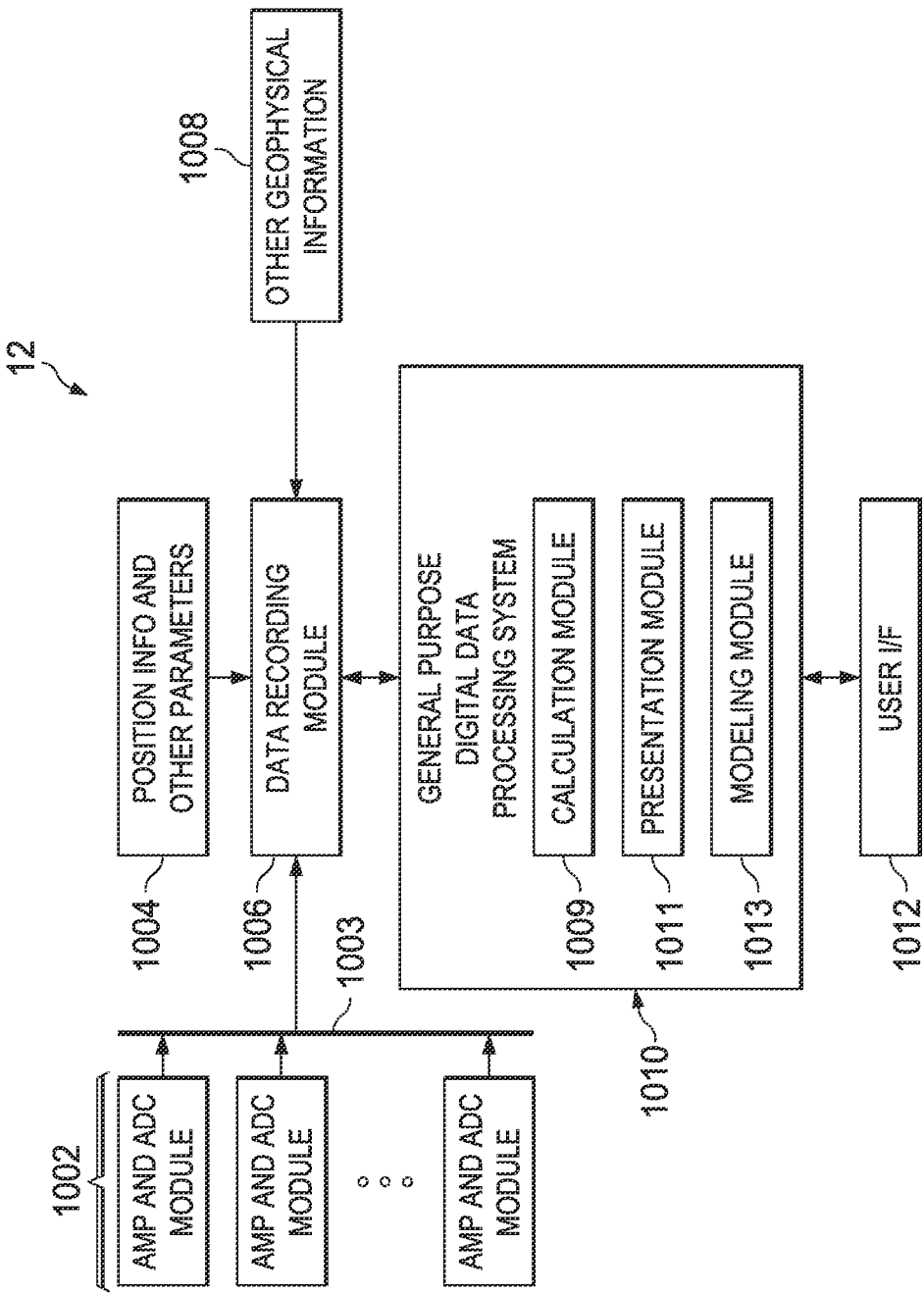
FIG. 10 shows an illustrative computer-based geophysical survey system.

The above-described method may be implemented as part of a data recording system 12, wholly or partially in software that executes on any of a wide variety of general purpose computers combined with some additional hardware, as shown in the illustrative embodiment of FIG. 10. Data is received by amplifier and analog-to-digital (A/D) modules 1002. This may be, for example, analog data provided by data acquisition modules that amplify the measured differential potential and transmit the amplified analog signal to data recording system 12 (similar, e.g., to data acquisition module 20 of FIG. 4, but without A/D 203). In other illustrative embodiments, amplifier and A/D module 1002 of FIG. 10 and data acquisition module 20 are one and the same, and it is the digital signals from the survey cables that are received by data recording module 1006, rather than a local digital signal from each of the amplifier and A/D modules 1002.

Data recording module 1006 stores the received digital data (representing the acquired data), position information and other related parameters (e.g., vessel speed), and other geophysical information (e.g., known general composition and properties of the strata and the surrounding water) for later retrieval and processing by software executing on general purpose digital data processing (GPDDP) system 1010. In at least some illustrative embodiments, the software executing on GPDDP system 1010 includes a calculation module 1009 that derives a common reference potential or multiple individual reference potentials, and combines electrode measurements to determine electric potential field differences between different cables relative to the common reference potential. The calculation module further generates an electric potential field map over a volume from the electrode measurements and the electric potential field differences. The software also includes a mapping module that produces a geophysical survey map based on the electric potential field map and on the other data provided by data recording module 1006, and a presentation module 1011 that presents the geophysical survey map to the user as an image on either a video display or a printing device. Alternatively, the geophysical survey map data may be stored by data recording module 1006 for later presentation to the user. Some illustrative embodiments also include a modeling module 1013 that calculates the value of an individual reference potential for each geophysical survey cable.

It should be noted that some or all of the software modules described above may also be implemented as hardware modules. Such illustrative embodiments may be implemented using field programmable gate arrays or application specific integrated circuits, just to name two examples. In at least some illustrative embodiments, only some of the modules are implemented as hardware modules and are combined with GPDDP system 1010 executing software that includes the remaining software modules as part of data recording system 12.

The data provided by data recording module 1006 may also be processed by software executing on GPDDP system 1010 in real-time with the results stored on data recording module 1006 as well. Additional processing may still also be performed by the software executing on GPDDP system 1010 at a later time on the stored data. The software executing on GPDDP system 1010 may be controlled and monitored by a user from User I/F 1012, which can include such devices as a monitor, mouse and keyboard. In the illustrative embodiment of FIG. 10, both incoming data as well as processed data are displayed by User I/F 1012 (e.g., on a monitor), and the user controls the acquisition, processing and storage of the data from User I/F 1012.

It should be noted that GPDDP system 1010 may be implemented using any computer system or architecture, including but not limited to single processor systems, multi-processor systems, distributed architectures, stand-alone architectures, client/server architectures, mainframe architectures, workstations, blade servers, real machines, virtual machines and/or any combinations of all of these. Further, just as the hardware may organized as a distributed system, the software executing on GPDDP system 1010 may similarly be divided into modules and sub-modules that can be distributed across multiple hardware elements within GPDDP system 1010. Many other hardware and software systems, architectures and organizations will become apparent to those of ordinary skill in the art, and all such hardware and software system, architectures and organizations, as well as all combinations thereof, are within the scope of the present disclosure.

By acquiring and processing EM survey data as illustrated by the example embodiments shown and described, variations in the sampled electric potential field data can be processed, analyzed and interpreted to generate 2D and 3D geophysical survey maps of underwater strata. For example, by analyzing the variations in the generated field, the resistivity and location of contrasting bodies, and thus the composition of the corresponding formations, can be determined and incorporated into such geophysical survey maps. For a more detailed description of how geophysical survey data is used to produce survey images, see, e.g., Constable, et. al., *An Introduction to Marine Controlled-Source Electromagnetic Methods for Hydrocarbon Exploration* (Geophysics, Vol. 72, No. 2, pp. WA3-WA12, March-April 2007).

Figure 11:
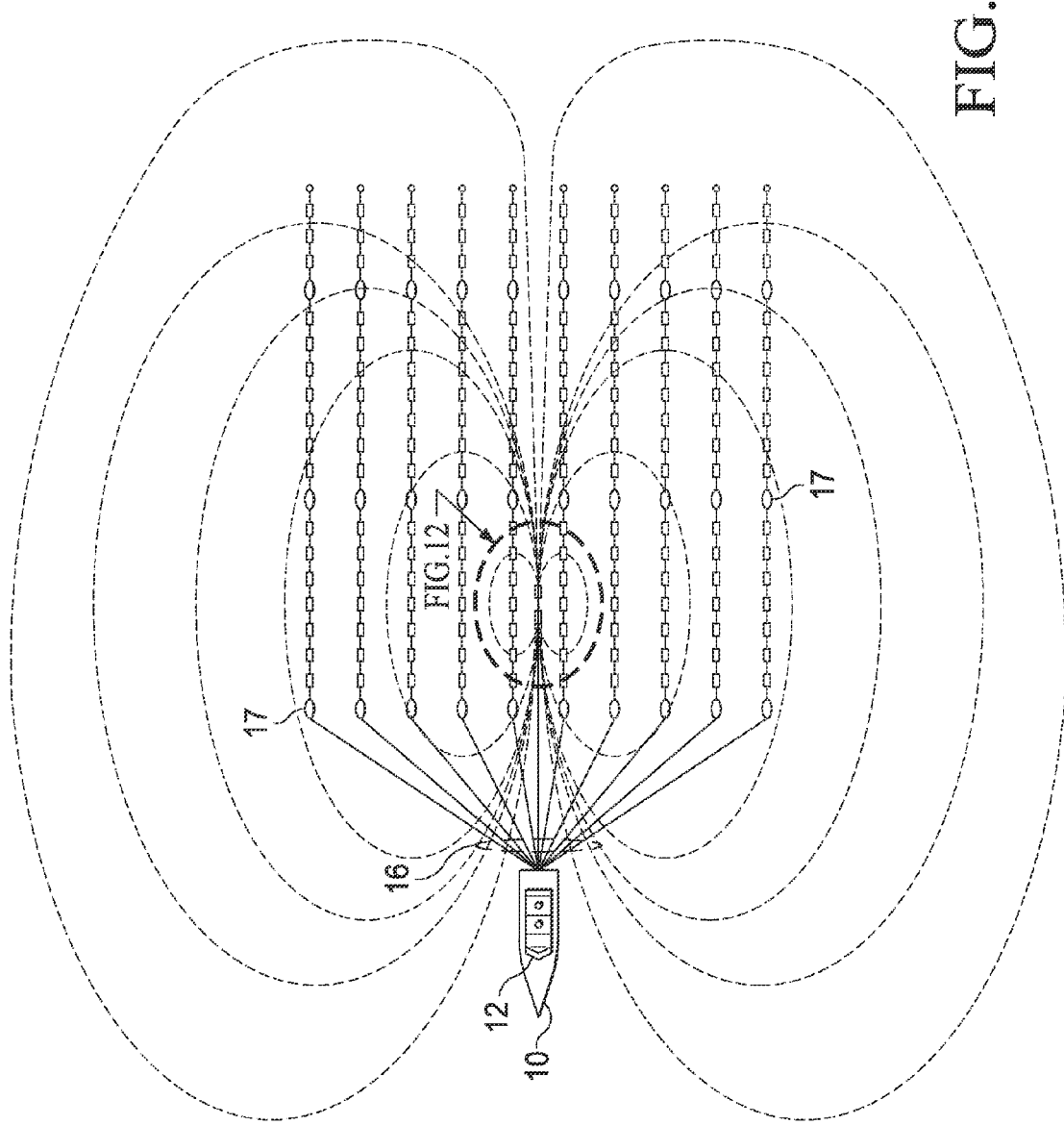
FIG. 11 is a top view of an illustrative geophysical survey system with an alternative geophysical source cable positioning.
Figure 12:
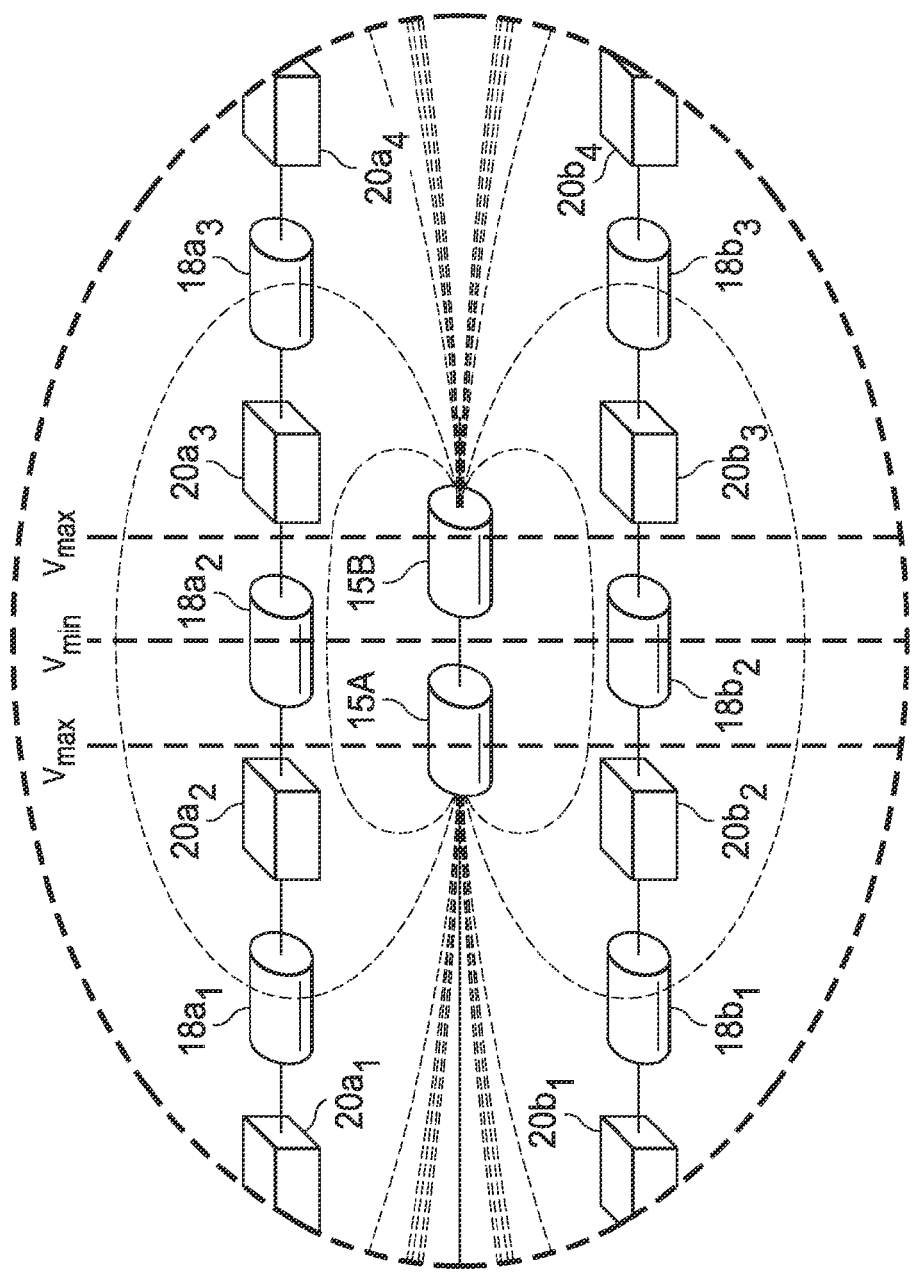
FIG. 12 shows the contours of the electric potential in different regions relative to the geophysical survey cables of FIG. 11.

While the illustrative systems and methods described above utilize a common electric potential assumed to be zero at or near the end of the geophysical survey cables, other illustrative embodiments may use alternative techniques for determining other individual reference potentials. Such an embodiment is shown in FIG. 11, which is similar to the embodiment of FIG. 5, but in which the geophysical source cable with transmitting electrodes 15A and 15B is towed aft of the geophysical survey cable electrodes that are closest to marine vessel 10. FIG. 12 shows the positioning of the geophysical source cable in more detail, and also shows three lines along which local minimum and maximum values of the electric potential are located for a given distance from the geophysical source cable's dipole. Points along the geophysical survey cables that intersect these lines may be used to identify electrodes suitable for providing an individual reference potential for each corresponding geophysical survey cable.

Continue to refer to FIG. 12, the line marked $V_{min}$ represents the approximate mid-point between transmitting electrodes 15A and 15B, where the electric potential is known to be about 0V. Similarly, the lines marked $V_{max}$ represent the end points of the dipole formed by electrodes 15A and 15B, where the electric potential along the dipole is known to be at its maximum value. Because each of these lines intersects each of the geophysical survey cables at points relatively close to the transmitting electrodes (as compared to the overall length of the geophysical survey cables), the behavior of the electric potential is dominated primarily by the conductivity of the water, thus making it well-behaved. As a result, the electric potential can be calculated at a given point relative to the transmitting electrodes by any of a number of known techniques.

Prior to performing such electric potential calculations, an electrode must first be selected as the reference electrode on each geophysical survey cable. The selection may be performed in at least two different ways:

1. By tracking the position of at least some point of each geophysical survey cable and selecting an electrode proximate to the desired reference point (e.g., an electrode closest to the intersection of its geophysical survey cable and the $V_{min}$ line); and
2. By identifying a change in the polarity of the sampled electric potential differences, indicative of proximity to a local minimum or maximum electric potential, and selecting one of the electrodes used to sample the difference with changed polarity (e.g., an electrode closest to the intersection of its geophysical survey cable and a $V_{max}$ line).

In at least some illustrative embodiments, the first above-listed technique is implemented by tracking the position of at least some of the electrodes along each of the geophysical survey cables (e.g., a subset of electrodes closest to the transmitting electrodes). In such an embodiment, acoustic transponders are installed at the head end of each geophysical cable that responds to a signal transmitted through a hull pole on marine vessel 10. Based on the response, a vector is calculated from the GPS position of marine vessel 10 and the head end of each geophysical cable. Compasses are also installed along the length of each geophysical cable, enabling the determination of the overall shape of each geophysical survey cable, and by implication the position of each geophysical survey cable electrode relative to the geophysical source cable.

In other illustrative embodiments, GPS receivers are installed on surface buoys at the front and back of each geophysical survey cable to track the position of each cable's front and rear segments, and on a surface buoy at the front source electrode, and thus track the position of the geophysical survey cable electrodes relative to the geophysical source cable. Regardless of the tracking technique used, once the position of each electrode proximate to the intersection of the $V_{min}$ line and each corresponding geophysical survey cable has been determined, a reference electrode may be selected on each cable (e.g., the electrode closest to the $V_{min}$ intersection with the corresponding cable, such as electrode 18a2 of FIG. 12). Many other techniques for tracking and determining the position of electrodes along a geophysical survey cable will become apparent to those of ordinary skill in the art, and all such techniques are within the scope of the present disclosure.

In at least some illustrative embodiments that implement the second above-listed technique, a polarity change in sampled electric potential differences is utilized as the criteria for selecting a reference electrode. Referring to FIG. 12, for example, the sampled electric potential difference sampled by data acquisition module 20b4 will be of one polarity (e.g., positive), while the electric potential difference sampled by data acquisition module 20b3 will be of the opposite polarity (e.g., negative). Thus, electrode 18b3 is the electrode along the lower geophysical survey cable that is closest to the leftmost $V_{max}$ line (i.e., closest to a point along the cable where the electric potential changes polarity), and this electrode is selected as the reference electrode. In other illustrative embodiments other electrodes may be selected based upon more complex criteria. For example, the electrode selected may be the electrode that is closest to a $V_{max}$ line and that is also below a certain signal-to-noise threshold so as to reduce the effect of electrical noise generated by marine vessel 10. Other criteria for selecting a reference electrode relative to its distance to a local minimum or maximum electric potential will become apparent to those of ordinary skill in the art, and all such criteria are within the scope of this disclosure.

Figure 13:
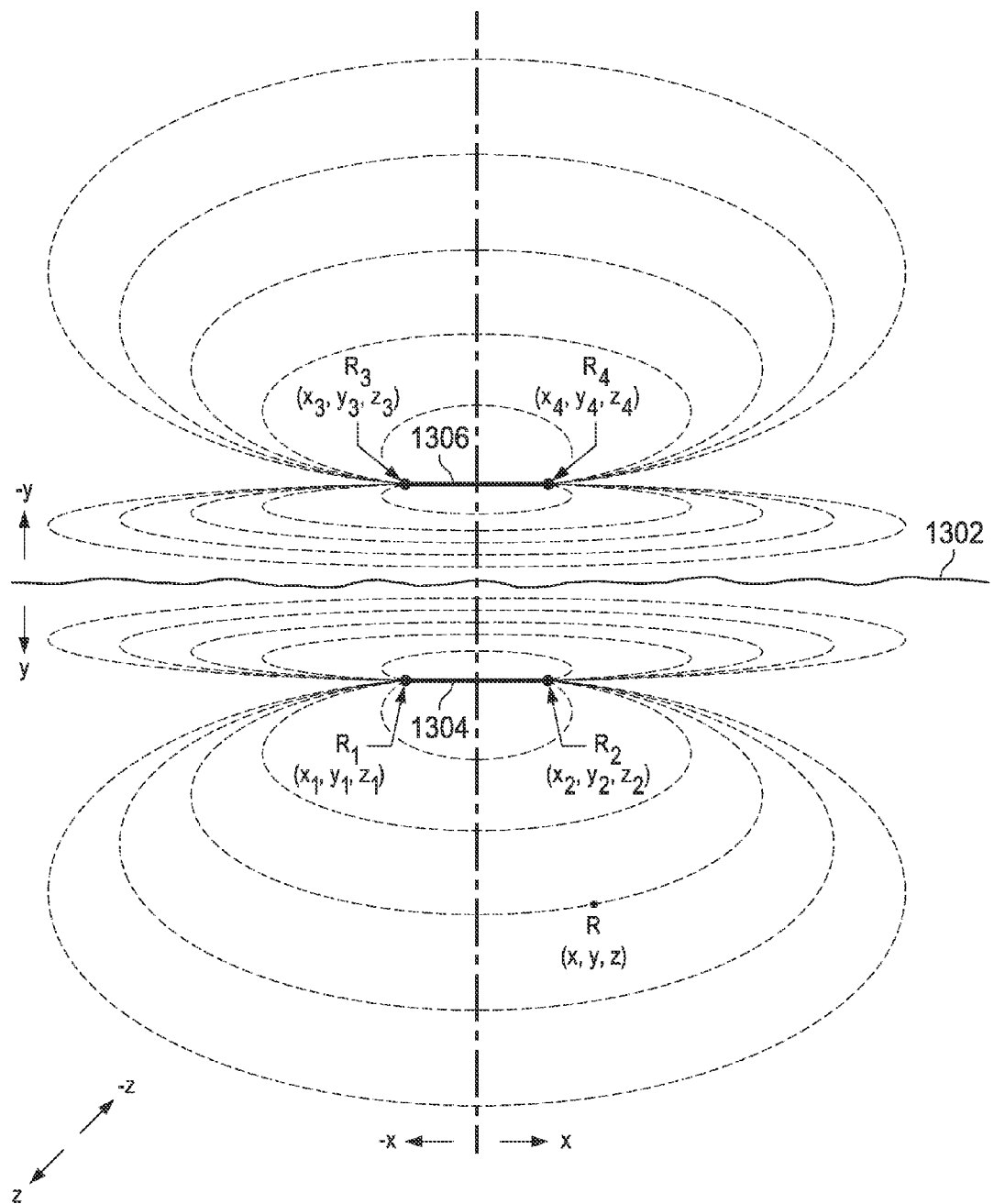
FIG. 13 shows an illustrative technique for modeling the electric potential of a point along a geophysical survey cable.

Once a reference electrode has been selected for a given geophysical survey cable, the electric potential for that electrode may be calculated. In at least some illustrative embodiments, this is performed as shown in FIG. 13. The dipole formed by transmitting electrodes 15A and 15B is represented by dipole 1304, with transmitting electrodes at points R1 (at coordinates $(x_1, y_1, z_1)$) and R2 (at $(x_2, y_2, z_2)$). The surface of the water 1302 is treated as an isolated surface, wherein the behavior of the resulting electric field is modeled by a mirrored dipole 1306 positioned above the surface 1302 by a distance equal to the depth of dipole 1304 below surface 1302. The electrodes of the mirrored dipole are located at points R3 (at $(x_3, y_3, z_3)$) and R4 (at $(x_4, y_4, z_4)$). For a given point R in space at location (x, y, z), the electric potential V can be calculated as:

$$V = \frac{I}{4\pi\sigma}\left(\frac{1}{R-R_1} + \frac{1}{R-R_3} - \frac{1}{R-R_2} - \frac{1}{R-R_4}\right) \quad (1)$$

where:
I=source current supplied to the dipole; and
σ=conductivity of the water.

Each of the point distances are calculated as a magnitude of the vector between the points. Thus, e.g., the magnitude of the vector $R-R_1$ is calculated as $\sqrt{(x-x_1)^2+(y-y_1)^2+(z-z_1)^2}$.

Given that the electric potential difference $V_{diff}$ between two points is known, as well as the position of each point, equation (1) can be expressed in terms of such a difference. Identifying the position of each geophysical survey cable electrode used to measure $V_{diff}$ as $R_{E1}$ and $R_{E2}$, the equation within parenthesis as attenuation factor A, and the attenuation factors for each electrode as $A_{E1}$ and $A_{E2}$, equation (1) can be expressed as:

$$V_{diff} = V_{E2} - V_{E1} = \frac{I}{4\pi\sigma}(A_{E2} - A_{E1}) \quad (2)$$

Solving for conductivity σ, we have:

$$\sigma = \frac{I}{4\pi V_{diff}}(A_{E2} - A_{E1}) \quad (3)$$

Once the conductivity of the water is known (either using the calculation described above or by other means), the electric potential V for the selected individual reference point is calculated using equation (1). This electric potential is the individual reference potential for the corresponding geophysical survey cable. The individual reference potential is used in the same manner as shown in FIG. 7 and previously described, but with the electric potential differences being added from right to left (i.e., towards the aft end of the survey cable) relative to the reference electrode.

It should be noted that the above equations are presented as only one illustrative example of a wide variety of techniques for calculating and/or modeling the electric potential of a point at a known distance from a geophysical source cable. Those of ordinary skill will recognize that many other techniques, as well as geophysical source cable configurations other than a simple dipole, are suitable for implementing other embodiments, and all such techniques, configurations and combinations of techniques and combinations are within the scope of the present disclosure.

Numerous other modifications, equivalents, and alternatives, will become apparent to those skilled in the art once the above disclosure is fully appreciated. For example, although the described embodiments show survey cables towed at a single common depth, other illustrative embodiments include one or more survey cables that are towed at different depths, enabling the production of 3D electric potential field maps using at least some measurement data sampled across three dimensions. Also, although the described embodiments are shown being towed by a surface marine vessel, the use of the described systems and methods are not limited to towed survey cables, or even to marine environments. Rather, the described methods can also be applied to surface or ocean-bottom survey systems to correlate sensor data from multiple survey cables. Further, although systems and methods are presented based upon either a common reference potential or individual (per cable) reference potentials, these systems and methods may be combined. Thus, e.g., individual reference potentials may be calculated for some of the geophysical survey cables within a system, while common reference potentials may be identified and applied to groups of other geophysical survey cables within the same system. It is intended that the following claims be interpreted to embrace all such modifications, equivalents, and alternatives where applicable.

What is claimed is:

1. An electromagnetic (EM) geophysical survey system that comprises:
   a plurality of geophysical survey cables each comprising a plurality of electrodes spaced apart along each geophysical survey cable's length;
   a plurality of data acquisition modules each configured to obtain measurements indicative of electric potential between two of the plurality of electrodes;
   a modeling module that calculates a reference potential at a selected electrode for each of the plurality of geophysical survey cables; and
   a calculation module configured to combine the measurements to produce one or more output signals indicative of the electric potential of each electrode relative to the reference potential.

2. The EM geophysical survey system of claim 1, wherein each selected electrode for a given geophysical survey cable is proximate to a point along said given geophysical survey cable, and wherein two electric potential differences of different polarities are each measured relative to electrodes on either side of said point.

3. The EM geophysical survey system of claim 1, further comprising an EM source and a tracking module, wherein the tracking module monitors a position of each selected electrode relative to the EM source for each of the plurality of geophysical survey cables.

4. The EM geophysical survey system of claim 3, wherein the modeling module calculates each reference potential based at least in part upon the tracked position of each corresponding selected electrode.

5. The EM geophysical survey system of claim 1, further comprising a presentation module configured to present a geophysical survey map to a user based at least in part on the one or more output signals.

6. The EM geophysical survey system of claim 1, wherein the plurality of electrodes are grouped into electrode pairs along each of the plurality of geophysical survey cables, and wherein each of the measurements are electric potential differences measured across one of the electrode pairs.

7. The EM geophysical survey system of claim 6, further comprising an EM source, wherein the calculation module combines the measurements by summing the measurements acquired at the electrode pairs between a given electrode and the selected electrode of the given electrode's geophysical survey cable.

8. The EM geophysical survey system of claim 1, wherein the calculation module is further configured to compute the electric potential difference between two electrodes that are each on two different geophysical survey cables of the plurality of geophysical survey cables.

9. The EM geophysical survey system of claim 1, wherein the calculation module is further configured to combine the one or more output signals to formulate an electric potential map.

10. The EM geophysical survey system of claim 9, wherein the electric potential map is formulated over an area or over a volume.

11. The EM geophysical survey system of claim 9, further comprising a mapping module that generates a geophysical survey map based at least in part on the electric potential map.

12. The EM geophysical survey system of claim 11, further comprising a presentation module, wherein the mapping module further provides data representing the geophysical survey map to the presentation module for presentation to the user.

13. The EM geophysical survey system of claim 11, further comprising a presentation module and a data recording module, wherein the mapping module further provides data representing the geophysical survey map to the data recording module for storage and later presentation to the user by the presentation module.

14. The EM geophysical survey system of claim 1, wherein the calculation module is implemented at least in part in hardware or at least in part in software.

15. The EM geophysical survey system of claim 1, wherein the input signals and the one or more output signals each comprises a digital signal or an analog signal.

16. The EM geophysical survey system of claim 1, wherein the calculation module performs at least part of the combination of the measurements in real-time.

17. The EM geophysical survey system of claim 1, further comprising a data recording module, wherein the measurements are stored by the data recording module for later processing by the calculation module.

18. An electromagnetic (EM) geophysical survey method that comprises:
   acquiring measurements indicative of electric potential between two of a plurality of electrodes spaced apart along each of a plurality of geophysical survey cables;
   calculating a reference potential at a selected electrode for each of the plurality of geophysical survey cables; and
   combining the measurements to determine the electric potential of each electrode on each geophysical survey cable relative to the reference potential.

19. The EM geophysical survey method of claim 18, wherein each selected electrode for a given geophysical survey cable is proximate to a point along said given geophysical survey cable, and wherein two electric potential differences of opposite polarities are each measured relative to electrodes on either side of said point.

20. The EM geophysical survey method of claim 18, further comprising:
   activating an EM source; and
   tracking a position of each selected electrode relative to the EM source for each of the plurality of geophysical survey cables.

21. The EM geophysical survey method of claim 20, wherein the calculating of each reference potential is based at least in part upon the tracked position of each corresponding selected electrode.

22. The EM geophysical survey method of claim 18, further comprising presenting a geophysical survey map to a user based at least in part on the electric potentials determined for each electrode.

23. The EM geophysical survey method of claim 18, further comprising grouping the plurality of electrodes into electrode pairs along each of the plurality of geophysical survey cables, wherein the acquiring of the measurements comprises measuring electric potential differences across one of the electrode pairs.

24. The EM geophysical survey method of claim 23, further comprising activating an EM source, wherein the combining of the measurements comprises summing the measurements acquired at the electrode pairs between a given electrode and the selected electrode of the given electrode's geophysical survey cable.

25. The EM geophysical survey method of claim 18, further comprising computing the electric potential difference between two electrodes that are each on two different geophysical survey cables of the plurality of geophysical survey cables.

26. The EM geophysical survey method of claim 18, wherein the acquiring of measurements comprises combining the measurements in real-time, or storing the data for the later combining of the measurements.

27. The EM geophysical survey method of claim 18, further comprising towing the plurality of geophysical survey cables across a body of water.

28. The EM geophysical survey method of claim 18, further comprising formulating an electric potential map from the electric potentials determined from the combining of the measurements.

29. The EM geophysical survey method of claim 28, further comprising formulating the electric potential map over an area or over a volume.

30. The EM geophysical survey method of claim 28, further comprising generating a geophysical survey map based at least in part on the electric potential map.

31. The EM geophysical survey method of claim 18, further comprising presenting the geophysical map to the user in real time, or storing data representing the geophysical map for later presentation to the user.

* * * * *